US008562061B2

United States Patent
Asai

(10) Patent No.: US 8,562,061 B2
(45) Date of Patent: Oct. 22, 2013

(54) SUN VISOR FOR VEHICLES

(71) Applicant: Kyowa Sangyo Co., Ltd., Toyota (JP)

(72) Inventor: Takashi Asai, Toyota (JP)

(73) Assignee: Kyowa Sangyo Co., Ltd., Toyota (JP)

( * ) Notice: Subject to any disclaimer, the term of this patent is extended or adjusted under 35 U.S.C. 154(b) by 0 days.

(21) Appl. No.: 13/735,445

(22) Filed: Jan. 7, 2013

(65) Prior Publication Data

US 2013/0119697 A1    May 16, 2013

Related U.S. Application Data

(63) Continuation of application No. 12/507,106, filed on Jul. 22, 2009, now abandoned.

(30) Foreign Application Priority Data

Jul. 28, 2008 (JP) .................................. 2008-193650
Jun. 22, 2009 (JP) .................................. 2009-147594

(51) Int. Cl.
*B60J 3/02* (2006.01)
(52) U.S. Cl.
USPC ........................................................ 296/97.12
(58) Field of Classification Search
USPC ............................................. 296/97.12, 97.9
See application file for complete search history.

(56) References Cited

U.S. PATENT DOCUMENTS

| RE39,316 E | 10/2006 | Murdock et al. |
| 2006/0175860 A1 | 8/2006 | Umemura |
| 2006/0267369 A1 | 11/2006 | Kearns et al. |
| 2008/0211256 A1 | 9/2008 | Jones et al. |
| 2008/0309115 A1 | 12/2008 | Nakajima et al. |

FOREIGN PATENT DOCUMENTS

| GB | 1 354 485 | 5/1974 |
| JP | A-5-246241 | 9/1993 |
| JP | U-5-86628 | 11/1993 |
| JP | A-2002-331832 | 11/2002 |
| WO | WO 2004/071796 A1 | 8/2004 |
| WO | WO 2008/108205 A1 | 9/2008 |

*Primary Examiner* — H Gutman
(74) *Attorney, Agent, or Firm* — Oliff & Berridge, PLC

(57) ABSTRACT

A sun visor for vehicles, in which a sun visor body can pivot on a support rod, and includes a biasing and holding member that biases and holds the support rod only by three regions in a circumferential direction of the support rod. The biasing and holding member is formed by bending a single leaf spring and integrally includes a support rod holding region and a biasing force generating region. The support rod holding region comprises the three regions that surround an outer surface of the support rod, and the biasing force generating region is formed at a predetermined distance from the support rod holding region in a direction transverse to the axial direction of the support rod. Further, the biasing force generating region is designed as a mounting part for mounting the biasing and holding member to the sun visor body.

4 Claims, 9 Drawing Sheets

SUN VISOR FOR VEHICLES

BACKGROUND OF THE INVENTION

1. Field of the Invention

The present invention relates to a sun visor for vehicles.

2. Description of the Related Art

A sun visor for vehicles includes a sun visor body and a support rod that can pivot with respect to the sun visor body. The sun visor body is mounted to an interior roof surface of a vehicle via the support rod and can pivot between a storage region along the roof surface and a use region along the windshield. A spring clip is provided inside the sun visor body and generates a predetermined rotating torque by biasing and holding the support rod from the outside when the sun visor body is pivoted. Such a sun visor for vehicles is disclosed, for example, in Japanese non-examined laid-open Patent Publication No. H5-246241. The known spring clip disclosed in this publication is formed by a leaf spring and obtains a rotating torque of the sun visor body by clipping the support rod from the outside.

The known spring clip is configured to contact the support rod at two points in the circumferential direction (two-point holding system), so that a greater biasing force (clipping force) is required to generate the required torque. As a result, an area of the support rod which has higher frequency of contact with the spring clip deforms (is dented or bent) by the biasing force of the spring clip. Further, if the support rod is made of synthetic resin, the support rod may creep, so that the support rod cannot retain its circular shape and torque fluctuations may occur. In this respect, further improvement is required.

SUMMARY OF THE INVENTION

Accordingly, it is an object of the invention to provide a technique for reducing biasing force acting upon a support rod, while securing a rotating torque to pivot sun visor body for a vehicle sun visor.

A representative vehicle sun visor according to the invention includes a sun visor body and a support rod for mounting the sun visor body to a vehicle, and the sun visor body can pivot on the support rod. The sun visor further includes a biasing and holding member that biases and holds the support rod only by three regions in a circumferential direction of the support rod. The biasing and holding member is formed by bending a single leaf spring and integrally includes a support rod holding region and a biasing force generating region. The support rod holding region comprises the three regions that surround an outer surface of the support rod, and the biasing force generating region is spaced apart a predetermined distance from the support rod holding region in a direction transverse to the axial direction of the support rod. The biasing force generating region is designed as a mounting part for mounting the biasing and holding member to the sun visor body. Further, the manner of "biasing and holding" in this invention refers to the manner of elastically holding the support rod by applying a spring force to the outer surface of the support rod.

According to the preferred embodiment of the sun visor in this invention, as a characterizing feature, the sun visor includes a biasing and holding member that biases and holds the support rod only by three regions in a circumferential direction of the support rod. Preferably, the three regions that bias and hold the support rod are arranged generally equidistantly in the circumferential direction, but the arrangement of the three regions is not limited to this. According to this invention, with the construction in which the support rod is held at three points in the circumferential direction, a biasing force upon each of the three regions of the support rod can be reduced, while a rotating torque required to pivot the sun visor body with respect to the support rod can be secured. As a result, an effect of preventing deformation of the support rod or an effect of reducing the occurrence of creep can be obtained.

Further, according to the preferred embodiment of the sun visor in this invention, the biasing and holding member is formed by a leaf spring and integrally includes a support rod holding region and a biasing force generating region, and the biasing force generating region is for tried at a predetermined distance from the support rod holding region in a direction transverse to the axial direction of the support rod. Further, the biasing force generating region is designed as a mounting part for mounting the biasing and holding member to the sun visor body. Thus, the biasing force generating region also serves as a mounting part. Therefore, it is not necessary to provide an additional mounting part, so that the biasing and holding member can be provided with a rational structure of holding the support rod.

Further, according to a further embodiment of the sun visor in this invention, the support rod holding region has two clipping regions that are opposed to each other and elastically clip the support rod, and a third contact region that receives the support rod. The two clipping regions are arranged such that respective normal of each clipping region extends toward the third contact region to cross each other. With such a construction, a force of clipping the support rod is generated by the opposed clipping regions, and the support rod can be pressed against the third contact region by the clipping force. Thus, the support rod can be held at three points in the circumferential direction with stability.

In the construction in which the support rod holding region has two opposed clipping regions and a third contact region, the third contact region may be formed by an extension extending from a free end of the clipping region, or it may be formed by an extension extending from a fixed end of the clipping region.

As described above, according to the invention, a technique is provided for reducing a biasing force acting upon a support rod, while securing a rotating torque required to pivot a sun visor body, in a sun visor for vehicles. Further, stability of torque generation can be further improved. Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved sun visors and method for using such sun visors and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

First Representative Embodiment

Figure 1:
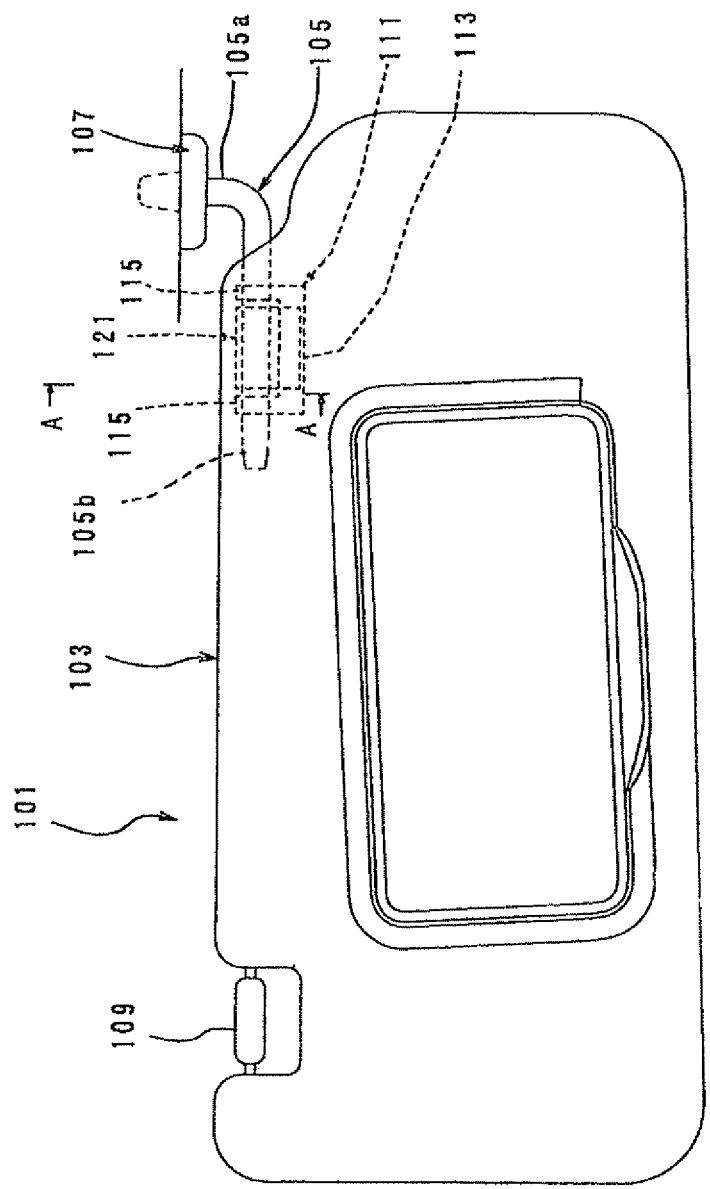
FIG. 1 is a front view schematically showing the entire structure of a sun visor for vehicles according to a first embodiment of the present invention.

A sun visor 101 for vehicles according to a first representative embodiment of the invention is now described with reference to FIGS. 1 to 6. FIG. 1 schematically shows the entire structure of the sun visor 101. As shown in FIG. 1, the sun visor 101 mainly includes a sun visor body 103, a support rod 105 having a circular section and provided to mount the sun visor body 103 to the vehicle, and a mounting bracket 107. The support rod 105 has a generally L-shaped configuration and includes a generally vertically extending rod portion 105a and a generally horizontally extending rod portion 105b. The horizontal rod portion 105b of the support rod 105 is pivotally mounted to one corner of the upper edge of the sun visor body 103. The vertical rod portion 105a of the support rod 105 is pivotally mounted to the front corner of the interior roof surface of the vehicle via the mounting bracket 107. For the sake of convenience of explanation, in FIG. 1, the axial direction of the horizontal rod portion 105b is taken as the lateral direction of the vehicle, the axial direction of the vertical rod portion 105a is as the vertical direction, a horizontal direction transverse to the axial direction of the horizontal rod portion 105b (the direction of the thickness of the sun visor body 103) is as the longitudinal direction of the vehicle.

The sun visor body 103 can be pivoted on the axis of the horizontal rod portion 105b of the support rod 105 between a storage region along the interior roof surface and a use (light-shielding) region along the windshield. Further, the sun visor body 103 can be pivoted on the axis of the vertical rod portion 105a between a front position along the windshield and a side position along a side window.

A support shaft 109 is provided on a free end portion of the upper edge of the sun visor body 103. The support shaft 109 is supported by a hook (not shown) mounted on the interior roof surface when the sun visor body 103 is placed in the front position, so that the pivotal movement of the sun visor body 103 in the front position between the storage position and the use position can be stabilized.

Figure 2:
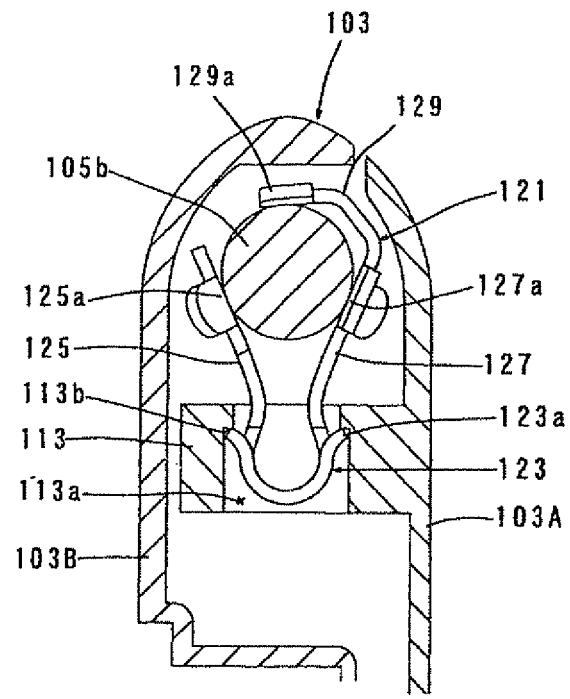
FIG. 2 is a sectional view taken along line A-A in FIG. 1, in the working state in which a sun visor body is placed in a use region.
Figure 3:
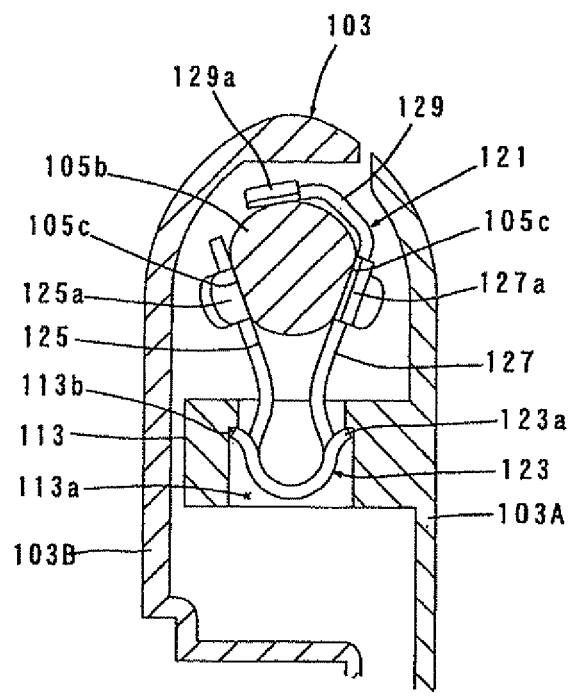
FIG. 3 is a sectional view taken along line A-A in FIG. 1, in the storage state (locked state) in which the sun visor body is placed in a storage region.
Figure 4:
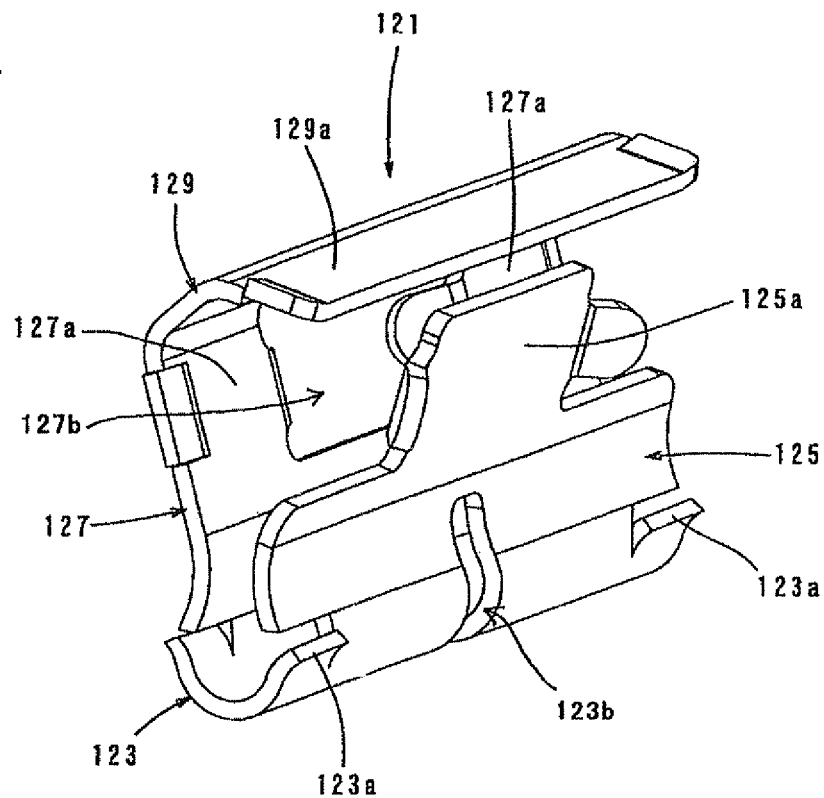
FIG. 4 is a perspective view showing the entire structure of a spring clip.
Figure 5:
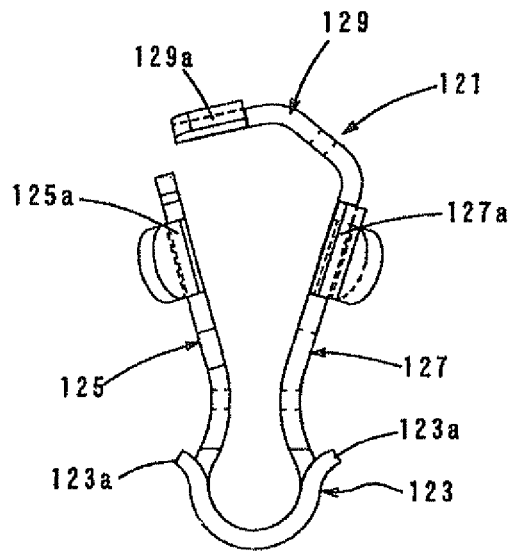
FIG. 5 is a side view of the spring clip.
Figure 6:
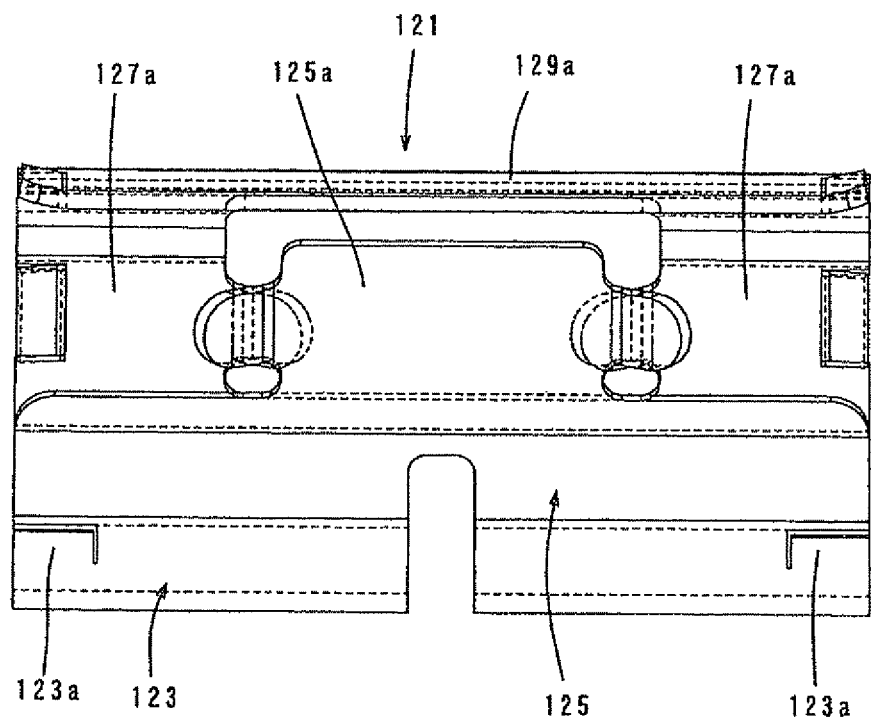
FIG. 6 is a front view of the spring clip.

FIGS. 2 and 3 are sectional views taken along line A-A in FIG. 1. FIG. 2 shows the working state in which the sun visor body 103 is placed in the use region, and FIG. 3 shows the storage state (locked state) in which the sun visor body 103 is placed in the storage region. Further, FIG. 4 is a perspective view showing a metal spring clip, FIG. 5 is a side view of the spring clip, and FIG. 6 is a front view of the spring clip.

As shown in FIG. 2, the sun visor body 103 according to this embodiment has a hollow shell structure having two body component parts 103A, 103B which are opposed to each other and joined together in the longitudinal direction of the vehicle (the direction of the thickness of the sun visor body). The outer surface of the sun visor body 103 is covered with a sheath. The two body component parts 103A, 103B are joined together, for example, by engagement between a plurality of coupling pins formed on one body component part 103A and boss holes of a plurality of bosses formed on the other body component part 103B, which are not shown. A bearing element 111 is provided within the internal space of the hollow sun visor body 103 and pivotally supports the horizontal rod portion 105b of the support rod 105.

As shown in FIG. 1, the bearing element 111 includes a clip support part 113 for supporting a metal spring clip 121 and right and left bearing parts 115 disposed on the right and left sides of the clip support part 113 (in the axial direction of the horizontal rod portion 105b). The horizontal rod portion 105b is inserted through the bearing element 111 such that it can pivot with respect to the bearing element 111 and is prevented from becoming removed from the bearing element 111. The bearing element 111 may be integrally formed with the one body component part 103A, or it may be formed as a separate member and fixedly mounted to the body component part 103A. The spring clip 121 is a feature that corresponds to the "biasing and holding member" according to this invention.

The spring clip 121 rotatably holds the horizontal rod portion 105b while applying a spring force from radially outward to an outer surface of the horizontal rod portion 105b of the support rod 105. Thus, when the sun visor body 103 is pivoted between the storage region and the use region, the spring clip 121 provides a predetermined rotating torque for rotation of the sun visor body 103. The spring clip 121 is a feature that corresponds to the "biasing and holding member" according to this invention.

As shown in FIGS. 2 to 6, the spring clip 121 is formed by bending a single leaf spring. The spring clip 121 mainly includes a generally U-shaped central bend 123 which generates a spring force, first and second arms 125, 127 extending upward (toward the horizontal rod portion 105b) from the central bend 123 and opposed to each other, and an arcuate extension arm 129 extending from an upper end of the second arm 127 toward an upper end of the first arm 125.

A first contact portion 125a is formed on the first arm 125 substantially in the middle in the longitudinal direction of the first arm 125 (in the axial direction of the horizontal rod portion 105b) and contacts the outer surface of the horizontal rod portion 105b. Two second contact portions 127a are formed on the second arm 127 and opposed to the first contact portion 125a in the respective positions displaced from the first contact portion 125a in the axial direction of the horizontal rod portion 105b. Specifically, the first contact portion 125a of the first arm 125 and the second contact portions 127a of the second arm 127 are opposed to each other in a staggered configuration. Further, a third contact portion 129a is formed on an extending end of the extension arm 129 and contacts the outer surface of the horizontal rod portion 105b. Specifically, the third contact portion 129a is formed by an extension of the free end of the second arm 127.

The distance between the first contact portion 125a of the first arm 125 and the second contact portions 127a of the second arm 127 is set such that the first arm 125 and the second arm 127 are opened outward from the central bend 123 when holding the circular outer surface of the horizontal rod portion 105b therebetween. By this outward opening, the central bend 123 generates a spring force, so that the first and second arms 125, 127 are provided with the spring force and clip the horizontal rod portion 105b by the spring force. The central bend 123 is a feature that corresponds to the "biasing force generating region" according to this invention. Further, the strength of the spring forces of the first and second arms 125, 127 can be appropriately set according to the distance between the first and second contact portions 125a, 127a, the thickness of the leaf spring or other similar factors.

The first and second contact portions 125a, 127a are formed by inclined flat surfaces and arranged such that respective normal of each inclined flat surface extends toward the third contact portion 129a and cross each other. Therefore, when the first and second contact portions 125a, 127a clip the horizontal rod portion 105b, the first and second contact portions 125a, 127a apply upward forces to the horizontal rod portion 105l, and the third contact portion 129a receives the upward forces. Specifically, in this embodiment, the spring clip 121 holds the horizontal rod portion 105b at three points in the circumferential direction, and the first, second and third contact portions 125a, 127a, 129a are arranged generally equidistantly or at intervals of 120 degrees in the circumferential direction of the horizontal rod portion 105b.

Further, the first, second and third contact portions 125a, 127a, 129a have respective predetermined lengths in the longitudinal direction of the spring clip 121. Therefore, the first, second and third contact portions 125a, 127a, 129a come substantially in line contact with the horizontal rod portion 105b. Particularly, the third contact portion 129a may be provided with a plane shape or curved shape insofar as the third contact portion 129a contacts with the horizontal rod portion 105b in a line-contact manner. In other words, the third contact portion 129a may be constructed, with respect to a cross-section crossing the longitudinal direction of the spring clip 121, to have a plane shape or curved shape having a diameter larger than the diameter of the horizontal rod portion 105b. The first arm 125 having the first contact portion 125a, the second arm 127 having the second contact portions 127a and the extension arm 129 having the third contact portion 129a are features that correspond to the "support rod holding region" according to this invention. Further, the first arm 125 having the first contact portion 125a and the second arm 127 having the second contact portions 127a are features that correspond to the "two clipping regions opposed to each other", and the extension arm 129 having the third contact portion 129a corresponds to the "third contact region" according to this invention.

As shown in FIGS. 2 and 3, the spring clip 121 having the above-described construction is mounted to the clip support part 113 by press-fitting the central bend 123 from above into a support hole 113a formed in the clip support part 113 of the bearing element 111. Upturned engagement pieces 123a are formed on outward portions of the central bend 123 by cutting and raising. When the engagement pieces 123a are press-fitted into the support hole 113a together with the central bend 123, upper end surfaces of the engagement pieces 123a are engaged with a stepped part 113b of the support hole 113a, so that the spring clip 121 is prevented from becoming detached therefrom. Specifically, the central bend 123 is a feature that corresponds to the "mounting part" according to this invention.

With respect to the prevention of the detachment of the spring clip 121, instead of the above-described construction, a concave portion may be formed at a side outer region of the central bend 123 or a penetration hole may be formed at a side region of the central bend 123, while forming a projecting portion at an inner wall of the support hole 113a. In such a construction, the projecting portion of the support hole 113a engages with the concave portion or with the penetration hole and thus, the spring clip 121 is prevented from becoming detached.

Further, with respect to the attachment of the spring clip 121 to the clip support part 113, in addition to the engagement pieces 123a, predetermined portion of the clip support part 113 as shown in FIGS. 1 to 3 may be engaged with the cutting portion 123b. By such a construction, because the cutting portion 123b is coupled to the predetermined portion of the clip support part 113, the spring clip 121 can be prevented from moving in a longitudinal direction thereof and as a result, the spring clip 121 can be secured in a stable manner.

As shown in FIG. 3, notch-like flat portions 105c are formed in areas of the horizontal rod portion 105b of the support rod 105 which come into contact with the first contact portion 125a of the first arm 125 and the second contact portions 127a of the second arm 127 in the axial direction of the horizontal rod portion 105b and have a predetermined extent in the circumferential direction of the horizontal rod portion 105b. The flat portions 105c are designed such that the spring forces (clipping forces) of the first and second contact portions 125a, 127a acting upon the horizontal rod portion 105b are applied as a torque with which the sun visor body 103 is forced to rotate toward the storage region when the sun visor body 103 is pivoted from the use position toward the storage position and reaches a predetermined intermediate position. FIG. 3 shows the sun visor body 103 placed in the storage region. In this position, the first contact portion 125a of the first arm 125 and the second contact portions 127a of the second arm 127 are held in face contact with the flat portions 105c of the horizontal rod portion 105b. In other words, the sun visor body 193 is locked. The notch-like flat portions 105c may be provided only with one of the first and second contact portions 125a, 127a.

Further, while a notch portion (concave portion) 127b is provided in certain area of the second contact portion 127a as shown in FIG. 4, the notch portion 127b may be abbreviated such that the second contact portion 127a has no concave.

As shown in FIG. 2, the spring clip 121 clips the outer surface of the horizontal rod portion 105b of the support rod 105 by the two opposed and elastically biased contact portions 125a, 127a of the first and second arms 125, 127 which are arranged at a distance of about 120 degrees from each other in the circumferential direction of the horizontal rod portion 105b. Then the third contact portion 129a receives the clipping forces applied to the horizontal rod portion 105b by the contact portions 125a, 127a. Specifically, according to this embodiment, the horizontal rod portion 105b of the support rod 105 is held at three points in the circumferential direction. Therefore, a spring force upon each of the contact portions 125a, 127a, 129a can be reduced compared with the known two-point holding system, while a rotating torque required to pivot the sun visor body 103 with respect to the horizontal rod portion 105b can be secured.

With the construction in which the spring force upon each holding point of the spring clip 121 can be reduced as described above, an area of the horizontal rod portion 105b which has higher frequency of use in a use region can be prevented from locally deforming (being dented or bent). Further, if the horizontal rod portion 105b is made, for example, of synthetic resin, the occurrence of creep of the horizontal rod portion 105b can be reduced, so that the circular form of the horizontal rod portion 105b can be retained for a longer period of time and ease of operation of pivoting the sun visor body 103 can be enhanced.

Further, with the construction in which the horizontal rod portion 105b is held at three points in its circumferential direction, the occurrence of radial displacement of the horizontal rod portion 105b and the spring clip 121 with respect to each other can be prevented when the sun visor body 103 is pivoted. In the known two-point holding system, radial displacement of the horizontal rod portion 105b and the spring clip 121 may occur with respect to each other at the start of the pivotal movement of the sun visor body. Such radial displacement may cause deterioration of operational feeling by torque release at the start of the pivotal movement. According to this embodiment, however, such a problem can be prevented.

Further, in order to mount the spring clip 121, the central bend 123 designed as a part for generating a spring force is inserted into the support hole 113a of the clip support part 113 of the bearing element 111. Specifically, the spring-force generating part also serves as a mounting part. Therefore, it is not necessary to provide an additional mounting part, so that the spring clip 121 can be provided with a rational structure of holding the horizontal rod portion.

Further, in the spring clip 121 according to this embodiment, the regions of holding the horizontal rod portion 105b are arranged such that respective normals of the first and second contact portions 125a, 127a which clip the horizontal rod portion 105b with a predetermined spring force applied thereto cross each other at about 120 degrees and extend toward the third contact portion 129a which is disposed above between the first and second contact portions 125a, 127a. Thus, a point of intersection between the normals to the first and second contact portions 125a, 127a which clip the horizontal rod portion 105b and a normal to the third contact portion 129a which receives the clipping force applied to the horizontal rod portion 105b is located on the center line of the horizontal rod portion 105b (on the bearing center line). Therefore, pivotal movement of the spring clip 121 with respect to the horizontal rod portion 105b is performed without axial runout (displacement of an axis of rotation in a direction transverse to the direction of its axis), so that the sun visor body 103 can be smoothly pivoted between the storage position and the use position with stability.

Further, with the configuration in which the first and second contact portions 125a, 127a are opposed to each other in a staggered configuration, the notch-like flat portions 105c for the first contact portion 125a and the second contact portions 127a can be formed in the horizontal rod portion 105b in positions displaced from each other in the axial direction. Therefore, deterioration of strength of the horizontal rod portion 105b can be lessened, compared with a construction in which the flat portions 105c for the first contact portion 125a and the second contact portions 127a are formed in the same position in the axial direction.

Second Representative Embodiment

Figure 7:
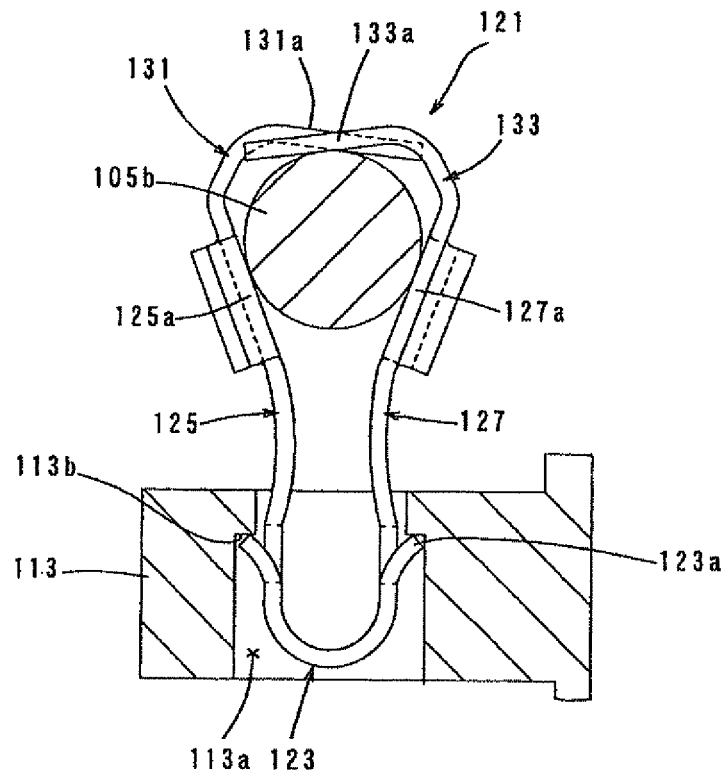
FIG. 7 is a side view of a spring clip according to a second embodiment, in the working state in which the sun visor body is placed in the use region.
Figure 8:
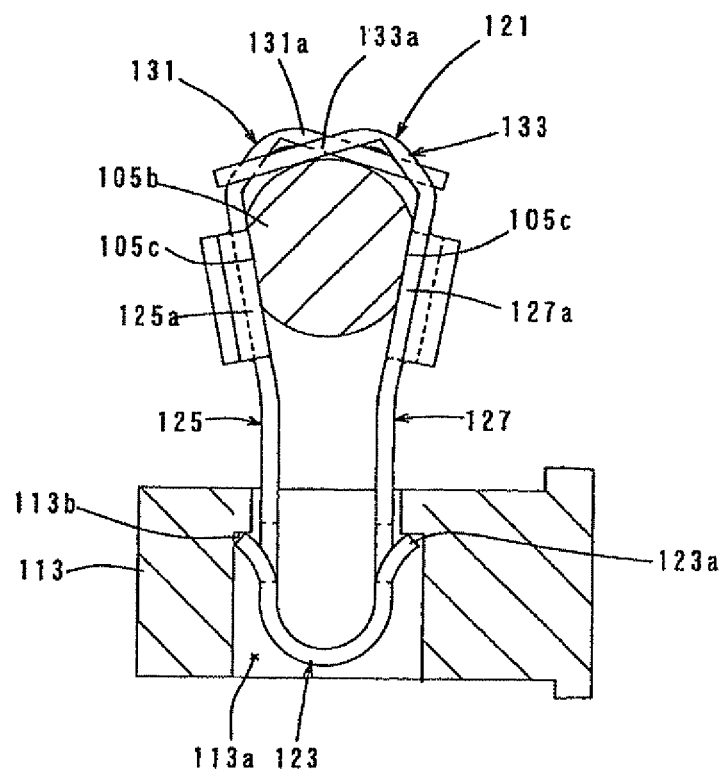
FIG. 8 is also a side view of the spring clip, in the storage state (locked state) in which the sun visor body is placed in the storage region.
Figure 9:
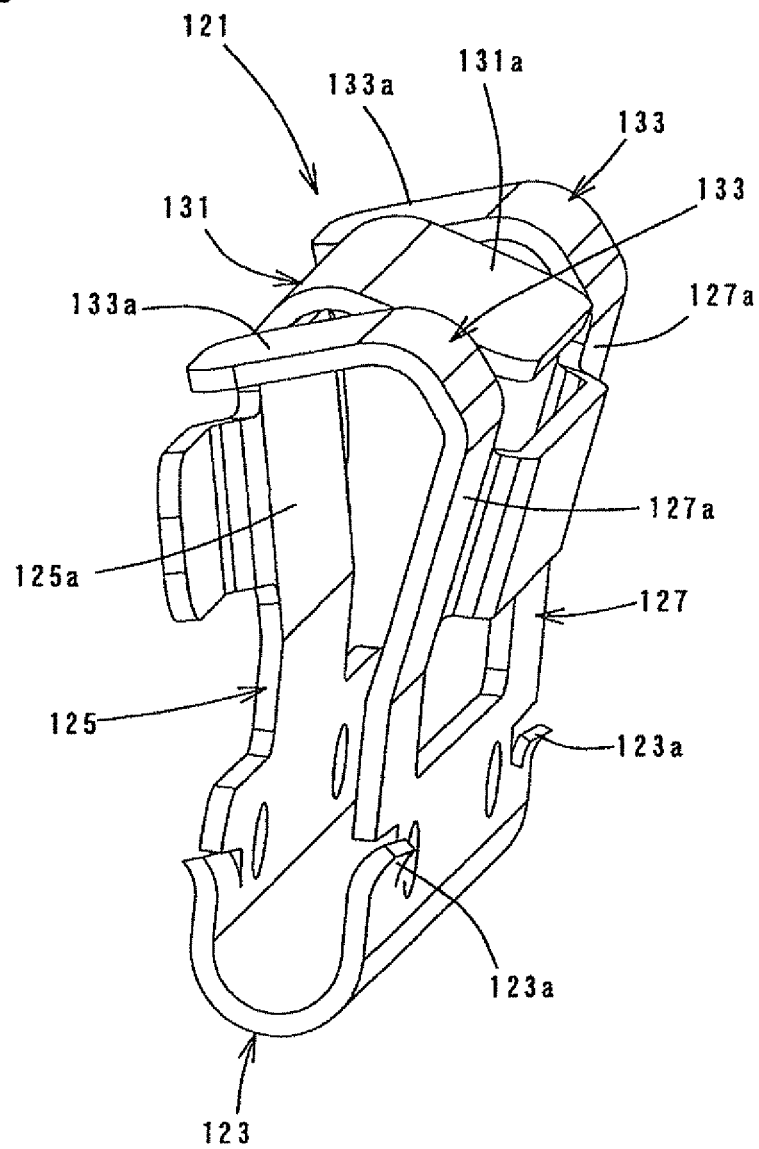
FIG. 9 is a perspective view showing the entire structure of the spring clip.
Figure 10:
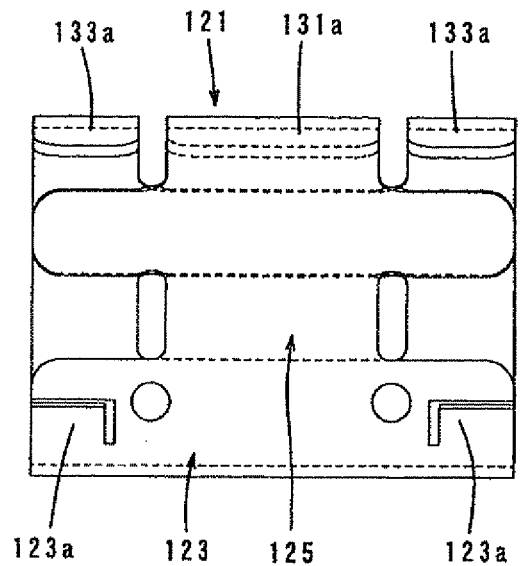
FIG. 10 is a front view of the spring clip.
Figure 11:
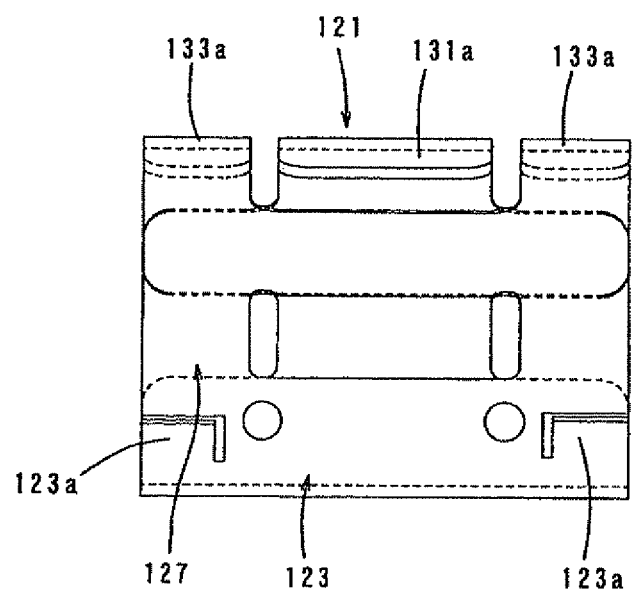
FIG. 11 is a rear view of the spring clip.

The spring clip 121 according to a second embodiment of the present invention is now described with reference to FIGS. 7 to 11. FIGS. 7 and 8 are sectional views of the spring clip 121 according to this embodiment. FIG. 7 shows the working state in which the sun visor body 103 is placed in the use region, and FIG. 8 shows the storage state (locked state) in which the sun visor body 103 is placed in the storage region. Further, FIG. 9 is a perspective view of the spring clip 121, FIG. 10 is a front view of the spring clip and FIG. 11 is a rear view of the spring clip.

This embodiment is an alteration to the shape of the spring clip 121 of the above-described first embodiment. In this embodiment, the first arm 125 and the second arm 127 have respective extension arms 131, 133, and inner surfaces of the extension arms 131, 133 or third contact portions 131a, 133a contact the outer surface of the horizontal rod portion 105b. In the other points, it has the same construction as the first embodiment. Therefore, components or elements which are substantially identical to those in the first embodiment are given like numerals and will not be described or briefly described.

Like in the first embodiment, a first contact portion 125a is formed on the first arm 125 substantially in the middle in the longitudinal direction of the first arm 125 (in the axial direction of the horizontal rod portion 105b) and contacts the outer surface of the horizontal rod portion 105b. Two second contact portions 127a are formed on the second aim 127 and opposed to the first contact portion 125a in the respective positions displaced from the first contact portion 125a in the axial direction of the horizontal rod portion 105b. Specifically, the first contact portion 125a of the first arm 125 and the second contact portions 127a of the second arm 127 are opposed to each other in a staggered configuration.

Correspondingly, the first arm 125 is provided with one extension arm 131 extending from the first contact portion 125a, and the second arm 127 is provided with two extension arms 133 extending from the two second contact portions 127a. Specifically, the extension aims 131, 133 are formed on the first and second arms 125, 127 in a staggered configuration in the axial direction of the horizontal rod portion 105b. Thus, the extension arms 131, 133 are avoided from interfering with each other and cooperate to receive the clipping force applied to the horizontal rod portion 105b.

The spring clip 121 according to this embodiment is thus constructed and can hold the horizontal rod portion 105b at three points in the circumferential direction. Therefore, like in the above-described first embodiment, a spring force upon each of the contact portions 125a, 127a, 131a, 133a can be reduced, and a rotating torque required to pivot the sun visor body 103 with respect to the horizontal rod portion 105b can be obtained.

Third Embodiment

Figure 12:
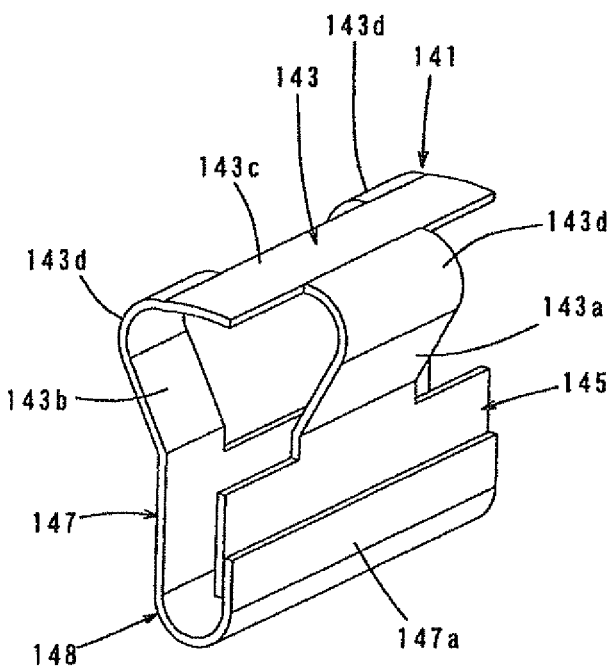
FIG. 12 is a perspective view showing the entire structure of a spring clip according to a third embodiment.
Figure 13:
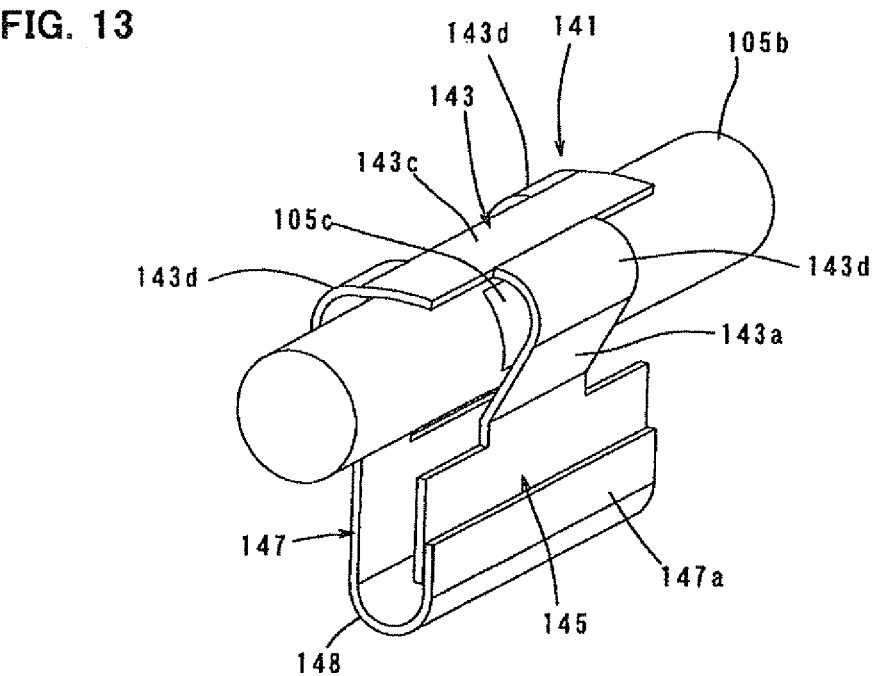
FIG. 13 is also a perspective view showing the entire structure of the spring clip, in the state in which a horizontal rod portion is held by the spring clip.
Figure 14:
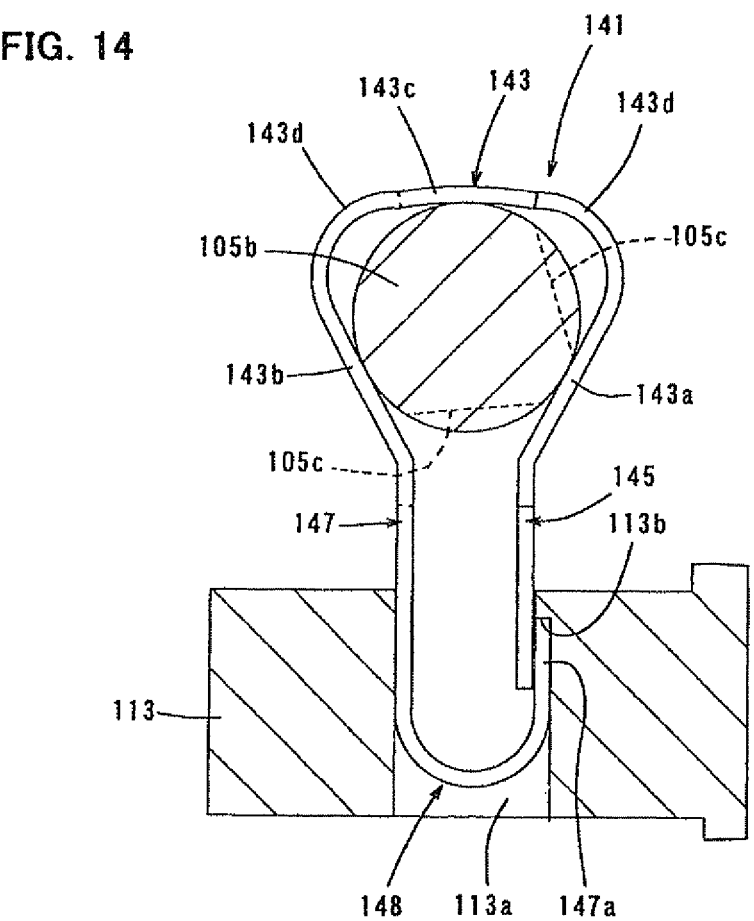
FIG. 14 is a side view of the spring clip.
Figure 15:
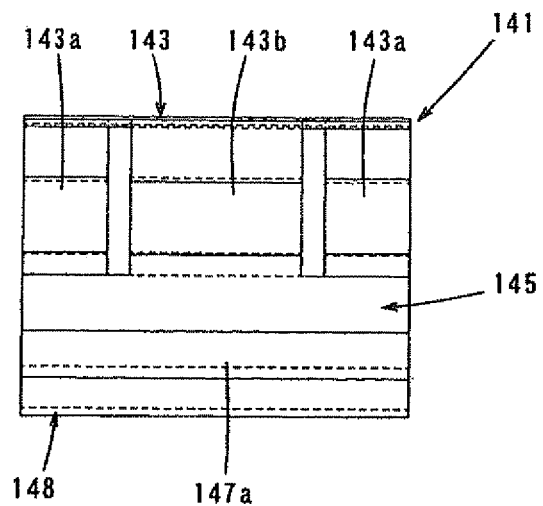
FIG. 15 is a front view of the spring clip.

A spring clip 141 according to a third embodiment of the present invention is now described with reference to FIGS. 12 to 15. FIGS. 12 and 13 are perspective views of the spring clip 141, and FIG. 13 shows the state in which the horizontal rod portion 105b is held by the spring clip. Further, FIG. 14 is a side view of the spring clip 141, and FIG. 15 is a front view of the spring clip 141.

The spring clip 141 according to this embodiment is formed by bending a single leaf spring. The spring clip 141 mainly includes a generally inverted triangular central bend 143, and first and second arms 145, 147 extending downward from the central bend 143 and opposed to each other. The central bend 143 forms a holding region for holding the horizontal rod portion 105b. The triangular central bend 143 has first and second contact portions 143a, 143b formed by its opposed two sides, and a third contact portion 143c formed by its top side corresponding to the base of the triangular shape.

Specifically, the spring clip 141 of this embodiment holds the outer surface of the horizontal rod portion 105b at three points in the circumferential direction, and the first, second and third contact portions 143a, 143b, 143c are arranged generally equidistantly (at intervals of about 120 degrees) in the circumferential direction of the horizontal rod portion 105b. The central bend 143 is a feature that corresponds to the "support rod holding region" according to this invention. Further, in this embodiment, the third contact portion 143c is formed by an extension extending between fixed ends 143d from which the first and second contact portions 143a, 143b elastically deform.

Further, as shown in FIG. 12, the first and second contact portions 143a, 143b are opposed to each other in a staggered configuration. Accordingly, as described in the first embodiment, the notch-like flat portions 105c for the first contact portion 143a and the second contact portions 143b can be formed in the horizontal rod portion 105b in positions displaced from each other in the axial direction. Therefore, compared with a construction in which the flat portions 105c for the first contact portion 143a and the second contact portions 143b are formed in the same position in the axial direction, deterioration of strength of the horizontal rod portion 105b can be reduced.

The first and second arms 145, 147 extend further downward from the first and second contact portions 143a, 143b. An extending end of the second arm 147 is folded over into a generally U-shaped form, and a folded end 147a of the second arm 147 is lapped on the outer surface of an extending end of the first arm 145. Then, as shown in FIG. 14, an extending end region 148 of the first and second arms 145, 147 is press-fitted from above into the support hole 113a of the clip support part 113. At this time, an upper end surface of the folded end 147a of the second arm 147 is engaged with a stepped portion 113b of the support hole 113a of the bearing element 111, so that the spring clip 141 is prevented from becoming detached therefrom.

The first and second contact portions 143a, 143b are both formed by inclined flat surfaces and arranged such that respective normal of each inclined flat surfaces extends toward the third contact portion 143c and cross each other. The distance between the first contact portion 143a and the second contact portions 143b is set such that the first arm 145 and the second arm 147 are opened outward from a fixed end in the form of the extending end region 148 supported by the clip support part 113 when holding the circular outer surface of the horizontal rod portion 105b therebetween. By this outward opening, a spring force is generated and applied to the first and second arms 145, 147. The first and second contact portions 143a, 143b clip the horizontal rod portion 105b by the spring force. The extending end region 148 of the arms 145, 147 is a feature that corresponds to the "biasing force generating region" and the "mounting part" according to this invention.

The spring clip 141 according to this embodiment can hold the circular outer surface of the horizontal rod portion 105b of the support rod 105 at three points in the circumferential direction. Therefore, a spring force upon each of the contact portions 143a, 143b, 143c can be reduced, while a rotating torque required to pivot the sun visor body 103 can be secured. As a result, an area of the horizontal rod portion 105b which have higher frequency of use in a use region can be prevented from locally deforming (being dented or bent). Further, if the horizontal rod portion 105b is made, for example, of synthetic resin, the occurrence of creep of the horizontal rod portion 105b can be reduced, so that the horizontal rod portion 105b can retain its circular shape for a longer period of time and ease of operation can be enhanced.

Further, with the construction in which the horizontal rod portion 105b is held at three points in its circumferential direction, the occurrence of radial displacement of the horizontal rod portion 105b and the spring clip 141 with respect to each other can be prevented when the sun visor body 103 is pivoted. In the known two-point holding system, radial displacement of the horizontal rod portion 105b and the spring clip 121 may occur with respect to each other at the start of the pivotal movement of the sun visor body. Such radial displacement may cause deterioration of operational feeling by torque release at the start of the pivotal movement. According to this embodiment, however, such a problem can be prevented.

Further, in this embodiment, in order to mount the spring clip 141, the extending end region 148 of the arms 145, 147 which is designed as a part for generating a spring force is inserted into the support hole 113a of the clip support part 113 of the bearing element 111. Specifically, the spring-force generating part also serves as a mounting part. Therefore, it is not necessary to provide an additional mounting part, so that the spring clip 141 can be provided with a rational structure of holding the horizontal rod portion.

In the above embodiments, the sun visor 101 is described as being of the type in which the bearing element 111 includes the clip support part 113 for supporting the spring clip 121 or 141 and the bearing parts 115 for pivotally supporting the horizontal rod portion 105b and is fixedly mounted to the sun visor body 103. However, the present invention may also be applied to a slide-type sun visor in which the bearing element 111 for pivotally supporting the horizontal rod portion 105b can slide with respect to the sun visor body 103 in the axial direction of the horizontal rod portion 105b.

DESCRIPTION OF NUMERALS 101 sun visor for vehicles
103 sun visor body
105 support rod
105a vertical rod portion
105b horizontal rod portion
105c flat portion
107 mounting bracket
109 support shaft
111 bearing element
113 clip support part
113a support hole
113b stepped portion
115 bearing part
121 spring clip (biasing and holding member)
123 central bend (biasing force generating region) (mounting part)
123a engagement piece
125 first arm (biasing and holding region) (clipping region)
125a first contact portion (biasing and holding region) (clipping region)
127 second arm (biasing and holding region) (clipping region)

127a second contact portion (biasing and holding region) (clipping region)
129 extension arm (biasing and holding region) (third contact region)
129a third contact portion (biasing and holding region) (third contact region)
131 extension arm (biasing and holding region) (third contact region)
131a third contact portion (biasing and holding region) (third contact region)
133 extension arm (biasing and holding region) (third contact region)
133a third contact portion (biasing and holding region) (third contact region)
141 spring clip (biasing and holding member)
143 central bend (biasing and holding region)
143a first contact portion (clipping region)
143b second contact portion (clipping region)
143c third contact portion (third contact region)
143d fixed end
145 first arm
147 second arm
147a folded end
148 extending end region (biasing force generating region) (mounting part)

What is claimed is:

1. A sun visor for a vehicle comprising:
a sun visor body,
a support rod having a circular section for mounting the sun visor body to a vehicle, the sun visor body having a substantially vertically extending rod portion and a substantially horizontally extending rod portion, the sun visor body respectively pivots on each extending rod portions,
a biasing and holding member that biases and holds the horizontally extending rod portion only by three regions in a circumferential direction of the horizontally extending rod portion, wherein
the biasing and holding member is formed by bending a single leaf spring and integrally includes a support rod holding region and a biasing force generating region, the support rod holding region comprising said three regions that surround an outer surface of the horizontally extending rod portion, and the biasing force generating region being formed at a predetermined distance from the support rod holding region in a direction transverse to an axial direction of the horizontally extending rod portion,
the biasing force generating region is provided as a mounting part for mounting the biasing and holding member to the sun visor body,
the support rod holding region has two clipping regions that are opposed to each other and elastically clip the horizontally extending rod portion, and a third contact region that receives the horizontally extending rod portion,
with respect to the axial direction of the horizontally extending rod portion, a width of one of the two clipping regions is narrower than a width of the third contact region,
the horizontally extending rod portion has a flat portion at a predetermined position in the circumferential direction of the horizontally extending rod portion, and
in a state that the sun visor body is rotated around the horizontally extending rod portion to be placed in a storage region, the one of the two clipping regions contacts with the flat portion of the horizontally extending rod portion to hold the sun visor body at the storage region, while in a state that the sun visor body is rotated to a region other than the storage region, said one of the two clipping regions contacts a circular portion of the horizontally extending rod portion.

2. The sun visor as defined in claim 1, wherein
the two clipping regions are arranged such that respective normal planes of the clipping regions extend toward the third contact region and cross each other.

3. The sun visor as defined in claim 2, wherein the third contact region comprises an extension extending from a free end of the two clipping regions.

4. The sun visor as defined in claim 2, wherein the third contact region comprises an extension extending from a fixed end of the two clipping regions.

* * * * *